United States Patent [19]

Yoshida et al.

[11] Patent Number: 4,527,465
[45] Date of Patent: Jul. 9, 1985

[54] CYLINDER APPARATUS FOR RACK AND PINION TYPE POWER STEERING MECHANISM OF MOTOR VEHICLE

[75] Inventors: Kenji Yoshida, Zama; Yuichi Sanada, Tokyo, both of Japan

[73] Assignee: Nissan Motor Company, Limited, Yokohama, Japan

[21] Appl. No.: 409,864

[22] Filed: Aug. 20, 1982

[30] Foreign Application Priority Data

Oct. 6, 1981 [JP] Japan .................. 56-159160

[51] Int. Cl.³ .............................................. F01B 9/00
[52] U.S. Cl. ........................................ 92/136; 92/152; 180/148
[58] Field of Search ............... 92/136, 130 C, 134, 92/152, 138, 147; 91/415, 416, 508, 533; 180/147, 148

[56] References Cited

U.S. PATENT DOCUMENTS

| | | | |
|---|---|---|---|
| 3,335,642 | 8/1967 | Rosaen | 92/110 |
| 3,461,779 | 8/1969 | Jablonsky | 92/136 |
| 3,502,001 | 3/1970 | Moore | 92/152 |
| 3,537,358 | 11/1970 | Bunyard | 92/136 |
| 3,704,986 | 12/1972 | Sheesley et al. | 92/138 |
| 3,824,898 | 7/1974 | Pauliukonis | 92/152 |
| 3,824,905 | 7/1974 | Jablonsky | 92/136 |
| 3,885,456 | 5/1975 | Forster et al. | 92/136 X |
| 4,275,641 | 6/1981 | Kopp | 91/400 |
| 4,418,781 | 12/1983 | Rabe et al. | 92/136 |

FOREIGN PATENT DOCUMENTS 2009065 6/1979 United Kingdom .
2056387 3/1981 United Kingdom .

Primary Examiner—Paul E. Maslousky
Attorney, Agent, or Firm—Schwartz, Jeffery, Schwaab, Mack, Blumenthal & Evans

[57] ABSTRACT

In a cylinder apparatus for a rack and pinion type power steering mechanism of a motor vehicle or the like, including two pressure chambers defined in a power cylinder, there is provided means for making the effective pressure-applied areas of the two pressure chambers substantially equal to each other, whereby steering operation can be performed with accuracy and ease.

2 Claims, 5 Drawing Figures

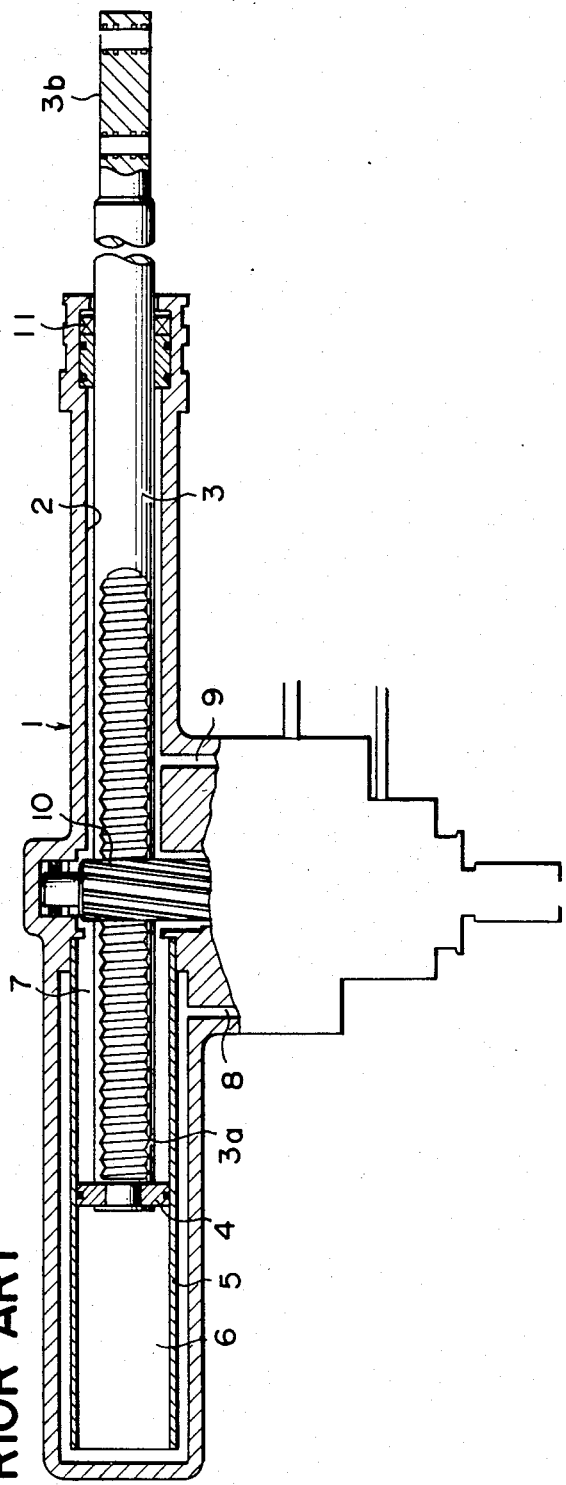
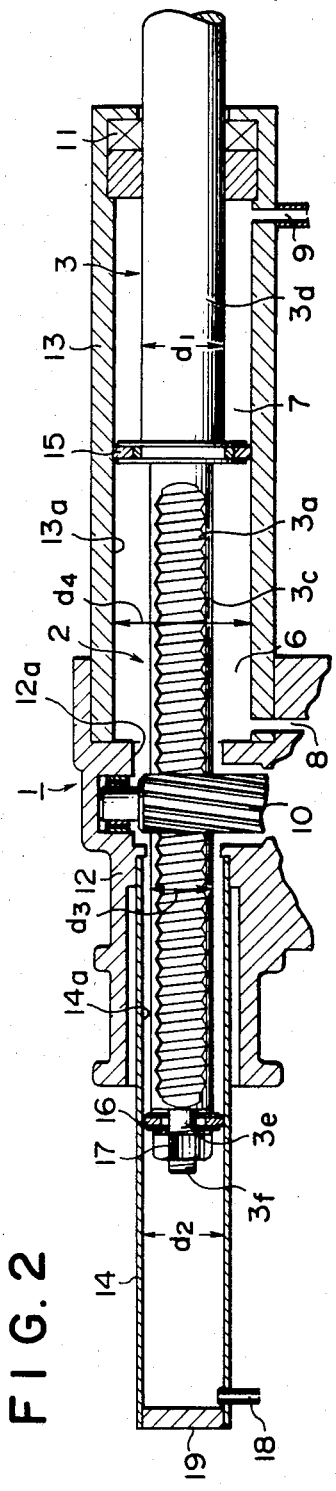
FIG. 1 PRIOR ART
FIG. 2

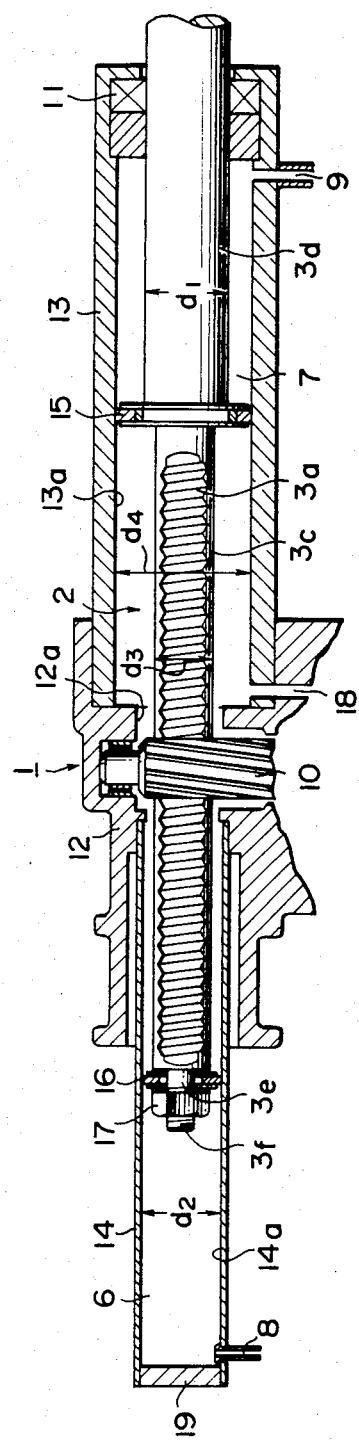
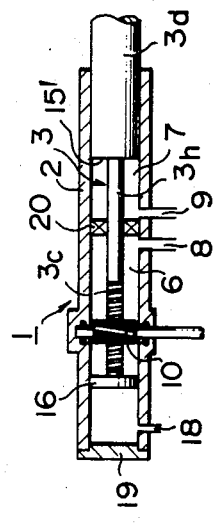
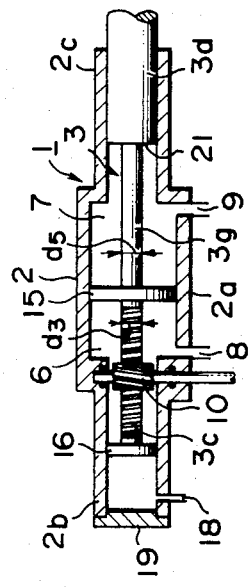

CYLINDER APPARATUS FOR RACK AND PINION TYPE POWER STEERING MECHANISM OF MOTOR VEHICLE

BACKGROUND OF THE INVENTION

1. Field of the Invention

This invention relates to a cylinder apparatus for a rack and pinion type power steering mechanism of a motor vehicle or the like, and more particularly it pertains to such a cylinder apparatus which is so designed that steering operation can be performed with accuracy and ease.

2. Description of the Prior Art

There has conventionally been proposed a cylinder apparatus for a power steering mechanism of the aforementioned type, such as shown in FIG. 1. In the conventional apparatus, a gear housing 1 is formed with a hole adapted to constitute a power cylinder 2, and a rack shaft 3 has its rack section 3a inserted in the power cylinder 2 and its fore end 3b projected out of the gear housing 1. A rod bracket (not shown) is attached to the fore end 3b of the rack shaft 3, and two tie rods (not shown) respectively connected to left and right wheels to be steered are tied at one end to the rod bracket.

Furthermore, a single power piston 4 is mounted on the rack shaft 3 at the end of the rack section 3a thereof in such a manner as to be slidable in a guide tube 5 which is fixedly provided in the power cylinder 2. The power piston 4 defines in the power cylinder 2 two pressure chambers 6 and 7 which are filled with operating fluid, which may be pressurized oil, pressurized gas or the like, and communicated with control valve means (not shown) provided in the gear housing 1 through passages 8 and 9 respectively. Coupled to a steering wheel (not shown) is a pinion 10 which is disposed in the gear housing 1 in intermeshing relationship with the rack section 3a of the rack shaft 3 and arranged to actuate the aforementioned control valve means in synchronism therewith. Denoted at 11 is a seal ring.

In the above-mentioned conventional arrangement, when the steering wheel is turned clockwise or anticlockwise, the pinion 10, which is connected to the steering wheel through a steering shaft or the like, will be rotated clockwise or anticlockwise as viewed in FIG. 1 so that the rack shaft 3 having the rack section 3a disposed in intermeshing relationship with the pinion 10 will be urged leftwardly or rightwardly, thus tending to cause the wheels to be steered to the left or right. Thereupon, the control valve means will also be actuated so that high pressure operating fluid available from a source (not shown) will be introduced into the pressure chamber 7 on the right hand side as viewed in FIG. 1 through the passage 9. At the same time, the operating fluid contained in the pressure chamber 6 on the left hand side as viewed in the figure will be exhausted therefrom through the passage 8 in a proportion corresponding to the quantity of operating fluid introduced into the other pressure chamber 7. In this way, an assist force will be produced which will in turn be imparted, together with a force resulting from the clockwise-turning of the steering wheel, to the rack shaft 3, thus assisting the latter in the aforementioned leftward movement. When the steering wheel is turned anticlockwise, the pinion 10 will also be rotated anticlockwise, and thereupon, the control valve means will be actuated reversely so that operating fluid will be introduced into the left hand side pressure chamber 6 while the operating fluid contained in the right hand side pressure chamber 7 will be exhausted therefrom in a proportion corresponding to the quantity of operating fluid introduced into the pressure chamber 6. In this way, an assist force will be produced which will in turn be imparted, together with a force resulting from the anticlockwise-turning of the steering wheel, to the rack shaft 3, thus assisting the latter in the aforementioned rightward movement.

With the foregoing conventional cylinder apparatus, however, since the pressure-applied areas of the power piston 4 are different between the two pressure chambers 6 and 7 due to the construction that the power cylinder 2 is divided into two sections, i.e., the two pressure chambers 6 and 7 by the power piston 4 mounted on the end of the rack shaft 3 and the rack shaft 3 is disposed to extend through the pressure chamber 7 with the fore end 3b thereof being projected out of the power cylinder 2, difficulties are encountered when it is attempted to make the fluid pressures prevailing on the left and right hand sides of the power piston 4 balanced in order to make nil the assist force at the neutral position. Another problem is such that a difference is caused between the steering forces required to steer the wheels to the left and right.

SUMMARY OF THE INVENTION

Accordingly, it is an object of the present invention to provide a novel and improved cylinder apparatus for a rack and pinion type power steering mechanism of a motor vehicle or the like, which is so designed as to obviate the aforementioned drawbacks of the prior art.

According to an aspect of the present invention, there is provided a cylinder apparatus for a rack and pinion type power steering mechanism, comprising:

a gear housing including a power cylinder;

a pinion disposed in said gear housing and operatively connected to a steering wheel;

a rack shaft provided with a rack portion disposed in intermeshing relationship with said pinion, said rack shaft being axially movable and inserted in said power cylinder with one end thereof extended out of one end of said power cylinder and coupled to a steering linkage;

a first pressure chamber defined in said power cylinder in such a manner that pressure fluid can be introduced thereinto;

a second pressure chamber defined in said power cylinder in such a manner that pressure fluid can be introduced thereinto;

first means provided on said rack shaft in association with said first pressure chamber for providing a first effective pressure-applied area operative to urge said rack shaft in a first direction when said pressure fluid is introduced into said first pressure chamber; and second means provided on said rack shaft in association with said second pressure chamber for providing a second effective pressure-applied area substantially equal to said first effective pressure-applied area and operative to urge said rack shaft into a second direction when said pressure fluid is introduced into said second pressure chamber.

Briefly, in accordance with the present invention, a first power piston is mounted on the rack shaft between the rack section and one end of the gear housing, and a second power piston is mounted on that end of the rack shaft which is disposed in the gear housing, so that two pressure chambers are defined in the gear housing. One of the pressure chambers is constructed so that the rack shaft is urged in one direction by imparting fluid pressure to the first power piston, while the other pressure chamber is arranged such that the rack shaft is urged in the opposite direction by applying fluid pressure either to the second piston or both the first and second power pistons. Importantly, means is provided for making equal or substantially equal the effective pressure-applied areas available in the respective pressure chambers for urging the rack shaft. The expression "effective pressure-applied areas" used herein means areas to which pressures are effectively applied to urge the rack shaft.

Other objects, features and advantages of the present invention will become apparent from the ensuing description taken in conjunction with the accompanying drawings.

BRIEF DESCRIPTION OF THE DRAWINGS

FIG. 1 is a schematic plan view, partly in section, showing the conventional cylinder apparatus for a power steering mechanism.

FIG. 2 is a schematic plan view, partly in section, showing the cylinder apparatus for a power steering mechanism according to an embodiment of the present invention.

FIG. 3 is a view similar to FIG. 2, showing the cylinder apparatus according to a second embodiment of the present invention.

FIG. 4 is a schematic sectional view showing a third embodiment of the present invention.

FIG. 5 is a schematic sectional view showing a fourth embodiment of the present invention.

DESCRIPTION OF THE PREFERRED EMBODIMENTS

Referring to FIG. 2 of the drawings, there is shown the cylinder apparatus according to an embodiment of the present invention, wherein a gear housing 1 comprises a valve body 12 having a longitudinal hole 12a formed therethrough, a first guide tube or cylinder member 13 and a second guide tube or cylinder member 14, the members 13 and 14 being attached to the valve body in such a manner that their holes 13a and 14a are disposed in co-axially opposing relationship with each other through the longitudinal hole 12a. A power cylinder 2 is constituted by the holes 13a and 14a of the cylinder members 13 and 14 and the longitudinal hole 12a of the valve body 12. A rack shaft 3 is provided which is inserted in the power cylinder 2.

The aforementioned rack shaft 3 comprises an intermediate-diameter section 3c which is provided with a rack section 3a, a large-diameter section 3d which is contiguous with the intermediate-diameter section 3c at one end thereof, and a small-diameter section 3e which is contiguous with the intermediate-diameter section 3c at the other end thereof. The small-diameter section 3e is externally threaded as shown at 3f. A first power piston 15 is fixedly mounted on the rack shaft 3 at the stepped junction between the large-diameter section 3d and the intermediate-diameter section 3c, and a second power piston 16 is fixedly mounted thereon at the stepped junction between the intermediate-diameter section 3c and the small-diameter section 3c. The power piston 16 is secured in position by means of a nut 17.

The rack shaft 3 is inserted, first at the small-diameter section 3e, into the power cylinder 2 so that the power cylinders are partitioned into two sections, i.e., two pressure chambers 6 and 7 by the first power piston 15 disposed in sliding contact with the wall surface of the hole 13a formed in the first cylinder member 13 and the second power piston 16 disposed in sliding contact with the wall surface of the hole 14a formed in the second cylinder member 14. More specifically, the pressure chamber 6 is defined by the hole 12a of the valve body 12, the hole 13a of the first cylinder member 13, the hole 14a of the second cylinder member 14, the end surface of the first power piston 15 and the end surface of the second power piston 16, and the other pressure chamber 7 is defined by the hole 13a of the first cylinder member 13, the end of the cylinder member 13 and the end surface of the first power piston 15. Each of the pressure chambers 6 and 7 is filled with operating fluid.

The diameter $d_1$ of the large-diameter section 3d of the rack shaft 3 is made equal to the hole diameter $d_2$ of the second cylinder member 14. Thus, the effective pressure-applied area $S_1$ available in the pressure chamber 6 acting on the first power piston 15, i.e., the area to which the fluid pressure is effectively applied to urge the rack shaft 3, is given by the following equation:

$$S_1 = \frac{\pi}{4}(d_4^2 - d_3^2) - \frac{\pi}{4}(d_1^2 - d_3^2)$$

$$= \frac{\pi}{4}(d_4^2 - d_1^2)$$

where $d_3$ is the diameter of the intermediate-diameter section 3c of the rack shaft 3, and $d_4$ is the hole diameter of the first cylinder member 13.

The effective pressure-applied area $S_2$ available in the pressure chamber 7 acting on the first power piston 15 is given by the following equation:

$$S_2 = \pi/4(d^2_4 - d^2_1)$$

Thus, it will be appreciated that the effective pressure-applied areas $S_1$ and $S_2$ available in the pressure chambers 6 and 7 respectively are equal to each other ($S_1 = S_2$).

Mounted at that end of the rack shaft 3 which is projected out of the power cylinder 2 is a rod bracket (not shown) to which are tied at one end two tie rods respectively coupled to the left and right wheels to be steered.

Furthermore, a pinion 10, which is rotatably supported by the valve body 12, is made to extend into the pressure chamber 6 and disposed in intermeshing relationship with the rack section 3a of the rack shaft 3. The pinion 10 is also connected to a steering wheel (not shown) so as to be rotated by turning the steering wheel. Control valve means (not shown) is provided in the valve body 12, and it is arranged to be actuated through the rotation of the pinion 10 in synchronism therewith. The control valve means is communicated with the left hand side pressure chamber 6 through a passage 8 and with the right hand side pressure chamber 7 through a passage 9. In FIG. 2, denoted at 11 is a seal ring, indicated at 18 is an air vent, and shown at 19 is an end closure.

Description will now be made of the operation of the aforementioned embodiment.

When the steering wheel is in its neutral position, the pinion 10 coupled to the steering wheel through the steering shaft or the like, and the rack shaft 3 having the rack section 3a disposed in intermeshing relationship with the pinion 10, are maintained in their neutral positions. In such a state, by virtue of the fact that the effective pressure-applied areas of the power piston 15 which are available in the respective pressure chambers 6 and 7, are equal to each other as mentioned above, no assist force to axially urge the rack shaft is imparted thereto. Thus, since the fluid pressures prevailing at the opposite sides of the first power piston 15 are balanced, it is ensured that the rack shaft 3 be maintained in its neutral position as mentioned above.

When the steering wheel is turned clockwise, the pinion 10 is also rotated clockwse as viewed in FIG. 2, so that the rack shaft 3 is moved to the left as viewed in the figure. Thereupon, the aforementioned control valve means is actuated in one direction to cause high pressure operating fluid available from a source (not shown) to be introduced into the pressure chamber 7 through the passage 9, while at the same time causing the operating fluid contained in the pressure chamber 6 to be exhausted therefrom in a proportion corresponding to the quantity of operating fluid introduced into the pressure chamber 7. In this way, the fluid pressure, together with the force resulting from the clockwise-turning of the steering wheel, is imparted to axially urge the rack shaft 3, thereby enabling the wheels to be readily steered to the right with a relatively small force for manipulating the steering wheel.

When the steering wheel is turned anticlockwise, the pinion 10 is also rotated anticlockwise as viewed in FIG. 2, so that the rack shaft 3 is moved to the right as viewed in the figure. Thereupon, the control valve means is actuated in the opposite direction to cause the operating fluid to be introduced into the pressure chamber 6, while at the same time causing the operating fluid contained in the pressure chamber 7 to be exhausted therefrom in the same manner as mentioned earlier. In this way, the fluid pressure, together with the force resulting from the anticlockwise-turning of the steering wheel, is imparted to urge the rack shaft 3, thereby enabling the wheels to be readily steered to the left. Advantageously, by virtue of the fact that the effective pressure-applied areas $S_1$ and $S_2$ respectively available in the pressure chambers are equal to each other as mentioned earlier, a substantially equal steering force is obtained whether the steering wheel is turned clockwise or anticlockwise, whereby the steering wheel can be accurately and easily manipulated with a comfortable feeling.

Assuming that fluid pressures $P_a$ and $P_b$ are available in the pressure chambers 6 and 7 respectively, the assist force F acting to urge the rack shaft to the right as viewed in the drawings is given by the following equation:

$$F = S_1 \cdot P_a - S_2 \cdot P_b$$

Thus, by making equal the fluid pressures $P_a$ and $P_b$, the assist force F can be made null so that the rack shaft 3 can be maintained in position. However, in the case where the diameter $d_1$ of the large-diameter section 3d of the rack shaft 3 and the hole diameter $d_2$ of the second cylinder member 14 are substantially equal, instead of being exactly equal, so that the ratio of the aforementioned effective pressure-applied areas $S_1$ and $S_2$ can be made close to unity, it is also possible to produce a substantially equal steering force irrespective of the turning direction of the steering wheel, thereby improving the steering feeling.

Referring to FIG. 3, there is shown a second embodiment of the present invention, which is similar to the embodiment shown in FIG. 2, except that the pressure chamber 6 on the left hand side as viewed in the figure is defined between the second power piston 16 and an end closure 19 provided at the outer end of the cylinder member 14. As will readily be appreciated, the effective pressure-applied area $S_3$ of the pressure chamber 6 is given by the following equation:

$$S_3 = \pi/4 \, d^2_2$$

Thus, by selecting hole diameter $d_2$ of the second cylinder member 14 to be $$d_2 = \sqrt{d^2_4 - d^2_1}$$

it is possible to make the aforementioned effective pressure-applied area $S_3$ equal to the effective pressure-applied area $S_2$ of the right hand side pressure chamber 7. In this way, through operation similar to that described above in connection with the first embodiment, similar effect can be produced. To cope with the change in location of the pressure chamber 6, however, the air vent 18 and passage 8 in the first-mentioned embodiment should be exchanged each other.

Referring to FIG. 4, there is shown a third embodiment of the present invention. In this embodiment, a rack shaft 3 is provided which comprises a large-diameter section 3d, a first small-diameter section 3g which forms a stepped junction 21 with the large-diameter section 3d, and a second small-diameter section constituting a rack section 3c which is equal in diameter to the first small-diameter section 3g. A power cylinder 2 is provided which comprises a first guide tube or cylinder member 2a, a second guide tube or cylinder member 2b which is smaller in diameter than the first cylinder member 2a and fluid-tightly closed at one end by an end closure 19, and a third guide tube or cylinder member 2c which is equal in diameter to the second cylinder member 2b. The second and third cylinder members 2b and 2c integrally connected to the first cylinder member 2a at the left and right hand side ends of the latter as viewed in FIG. 4, respectively. A first power piston 15 is fixedly mounted on the rack shaft 3 at an intermediate point between the first and second small-diameter sections 3c and 3g, and a second power piston 16 is also fixedly mounted on the rack shaft 3 at that end of the latter which is disposed in the power cylinder 2. As shown in FIG. 4, the first and second power pistons 15 and 16 are disposed in the first and second cylinder members 2a and 2b, respectively, and the stepped portion 21 of the rack shaft 3 is disposed in the third cylinder member 2c, so that a first pressure chamber 6 is defined between the first and second power pistons 15 and 16 and a second pressure chamber 7 is defined between the first power piston and the inner end surface of the large-diameter section 3d of the rack shaft 3. In FIG. 4, denoted at 8 and 9 are fluid passages which are provided in communication with the first and second pressure chambers 6 and 7, respectively, and indicated at 18 is an air vent. According to this embodiment, the diameters $d_3$ and $d_5$ of the first and second sections 3b and 3c of the rack shaft 3 are made to be equal to each other as mentioned above, so that the surface area of the stepped portion 19 between the sections 3d and 3g and the inner end surface area of the second power piston 16 are made to be equal to each other. In this way, equal effective pressure-applied areas become available in the two pressure chambers respectively, thus resulting in similar effects to those obtained by the construction according to the first-mentioned embodiment of the present invention.

Referring to FIG. 5, there is shown a fourth embodiment of this invention. In this embodiment, there is provided a rack shaft 3 which comprises a large-diameter section 3d and a small-diameter section 3h provided with a rack section 3c, a stepped portion 15' being formed between the sections 3d and 3h. It is to be noted that the stepped portion 15' is adapted to serve as a power piston. A power piston 16 is fixedly mounted on the rack shaft 3 at the free end of the small-diameter section 3c, the diameter of the power piston 16 being equal to that of the large-diameter section 3d. A seal member 20 is fixedly provided in the power cylinder 2, with the outer periphery thereof being attached to the inner wall surface of the power cylinder 2, so that a first pressure chamber 6 and a second pressure chamber 7 are defined between the seal member 20 and the power piston 16 and between the seal member 20 and the stepped portion 15' of the large-diameter section 3d of the rack shaft 3. The seal member 20 is arranged to provide fluid-tight sealing between the two pressure chambers 6 and 7, and it is also arranged such that the small-diameter section 3h of the rack shaft 3 is axially movable in sliding contact therewith. In FIG. 5, indicated 8 and 9 are fluid passages which are provided in communication with the pressure chambers 6 and 7 respectively, denoted at 18 is an air vent, and shown at 19 is an end closure. With such a construction, it will be readily appreciated that similar effects to those obtained with the foregoing embodiments can be attained.

As will be appreciated from the foregoing discussion, according to the present invention, the first power piston is provided between the rack section and one end of the gear housing; the second power piston is provided on that end of the rack shaft which is disposed in the gear housing; one of the two pressure chambers defined in the gear housing is arranged such that fluid pressure is applied to the first power piston to urge the rack shaft 3 in one direction; the other pressure chamber is constructed so that fluid pressure is applied either to the second power piston alone or both the first and second power pistons to urge the rack shaft in the opposite direction; and the effective pressure-applied areas available in the respective pressure chambers for operating the rack shaft are made to be equal or substantially equal to each other. With such a construction, the fluid pressures available in the two pressure chambers acting on the rack shaft can be balanced so that assist force to be imparted to the rack shaft can be made to be null or extremely small when the rack shaft is located at its neutral position, thereby greatly facilitating adjustment for balancing fluid pressures which act on the rack shaft. Furthermore, by virtue of the fact that the effective pressure-applied areas available in the two pressure chambers are either equal to each other or only slightly different from each other, the difference between the force required when the steering wheel is turned clockwise and that required when the steering wheel is turned anticlockwise, is minimized so that the steering wheel can be accurately and easily manipulated with a comfortable feeling.

While the present invention has been described and illustrated with respect to specific embodiments thereof, it is to be understood that the invention is by no means limited thereto but covers all changes and modifications which will become possible within the scope of the appended claims.

What is claimed is:

1. A cylinder apparatus for a rack and pinion type power steering mechanism, comprising:
a gear housing including a power cylinder;
a pinion disposed in said gear housing and operatively connected to a steering wheel;
a rack shaft provided with a rack portion disposed in intermeshing relationship with said pinion, said rack shaft being axially movably inserted in said power cylinder with one end thereof extended out of one end of said power cylinder and coupled to a steering linkage, said rack shaft comprising a large-diameter section, an intermediate-diameter section constituting said rack portion and a small-diameter section, there being a stepped junction between said large-diameter section and said intermediate-diameter section and a stepped junction between said intermediate-diameter section and said small-diameter section;
a first pressure chamber defined in said power cylinder in such a manner that pressure fluid can be introduced thereinto;
a second pressure chamber defined in said power cylinder in such a manner that pressure fluid can be introduced thereinto;
first means provided on said rack shaft in association with said first pressure chamber for providing a first effective pressure-applied area operative to urge said rack shaft in a first direction when said pressure fluid is introduced into said first pressure chamber; and
second means provided on said rack shaft in association with said second pressure chamber for providing a second effective pressure-applied area substantially equal to said first effective pressure-applied area and operative to urge said rack shaft into a second direction when said pressure fluid is introduced into said second pressure chamber;
said first means comprising a first power piston disposed in said power cylinder and fixedly mounted on said intermediate-diameter section of said rack shaft at the stepped junction between said large-diameter section and said intermediate-diameter section in such a manner that said first pressure chamber is defined between said first power piston and said one end of said power cylinder;
said second means comprising a second power piston disposed in said power cylinder and fixedly mounted on said small-diameter section of said rack shaft at the stepped junction between said intermediate-diameter section and said small-diameter section in such a manner that said second pressure chamber is defined between said second power piston and the other end of said power cylinder.

2. A cylinder apparatus as set forth in claim 1, wherein:
said power cylinder comprises a first cylinder member of a first inside diameter having said first power piston disposed therein, and a second cylinder member of a second inside diameter smaller than said first inside diameter having said second power piston disposed therein; and the diameter of said large-diameter section of said rack shaft, the diameter of said intermediate-diameter section thereof, the inside diameter of said first cylinder member and the inside diameter of said second cylinder member are selected so as to establish said substantial equality between said first effective pressure-applied area and said second effective pressure-applied area.

* * * * *